UNITED STATES PATENT OFFICE.

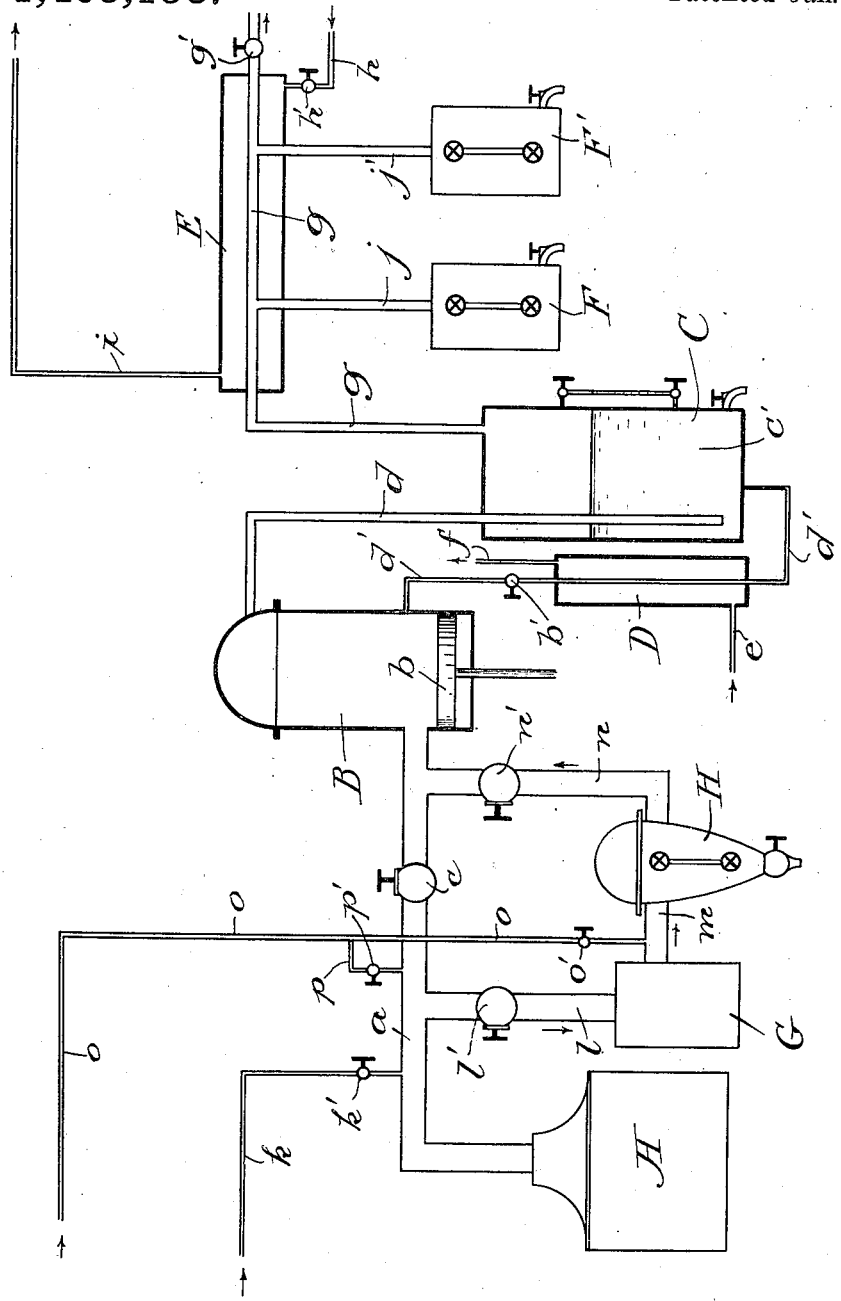

AUGUSTE JEAN PARIS, JR., OF BRADFORD, PENNSYLVANIA.

PROCESS OF TREATING CRUDE OIL AND GASES.

1,405,153.  Specification of Letters Patent.  Patented Jan. 31, 1922.

Application filed July 9, 1914. Serial No. 849,896.

*To all whom it may concern:*

Be it known that I, AUGUSTE JEAN PARIS, Jr., a citizen of the United States, residing in Bradford, county of McKean, and State of Pennsylvania, have invented a certain new and useful Process of Treating Crude Oil and Gases, of which the following is a specification.

This invention is a process of treating crude oil, and any gases carrying valuable condensable products, or some of the constituents or components of said crude oil or gases, for the purpose of recovering valuable products therefrom in a purified and refined condition. Among the gases which may be used in practicing the process may be mentioned oil gas, natural gas, coal gas, gas resulting from the distillation of lignite, wood, etc., it being understood that I may operate on one or a mixture of any two or more of the specified products.

One salient feature of the invention consists in using a certain gas as a vehicle, or carrier, and with which is compressed the vapors from crude oil, or a gas containing valuable condensable constituents, whereby there is produced a gaseous mixture carrying the valuable vapors, and which mixture may be subsequently manipulated or treated so as to separate the various liquefiable products in accordance with their condensable temperatures.

In some instances, the gas which is employed as the vehicle or carrier may be one such as hydrogen, nitrogen, carbonic oxide, etc., which carries no valuable condensable constituents; on the other hand, the carrier, per se, may contain valuable condensable constituents, as would be the case if coal gas, oil gas, natural gas, etc., were employed. In some cases the separate carrier referred to need not be used, since there may be sufficient gas normally mixed with the vapors to serve as a carrier.

In the preferred manner of practicing the invention, the carrier and the crude petroleum, or constituent thereof, are preferably mixed in the compression cylinder during the operation of compression, although it will be understood that the mixture may be made, if desired, prior to introducing the same into the compression cylinder.

In most instances I find it advantageous to effect the compression in the presence of a heat preventive agent, i. e., one which precludes, in whole or in part, the heat of compression. For this purpose I have used lubricating oil, glycercides, fish oil, castor oil, oleic acid, etc. These agents also act to purify the gases and vapors with which they are compressed and, more particularly, by absorbing tarry matters therefrom. The quantity of the heat preventive agent employed will depend, naturally, upon several conditions, but I have found that good results are secured by using from one to three gallons of the agent for each one hundred feet of gas compressed to a pressure of say two hundred pounds. The temperature of the resulting mixture depends upon various factors, such as the character of the materials being compressed, the degree of pressure, their temperature prior to introduction into the compression cylinder, the character of the heat preventive, the temperature and amount thereof, etc. By manipulating these factors, the compressed mixture may be obtained at almost any desired temperature.

The mixture having been obtained as described, it is then successively cooled to gradually lower temperatures, whereby there results a separation of the various liquefiable products in accordance with their respective gravities and condensable temperatures.

Features of the process, other than those referred to, ante, will appear from the hereinafter detailed description.

In the accompanying drawing, I have illustrated a novel apparatus, of my invention, which may be used in practicing the process of the present application, but it will be also understood that the process, or parts thereof, may be practiced in apparatus quite distinct, at least from a specific standpoint, from the apparatus illustrated and described herein.

The said drawing is an elevation, parts thereof being shown in section, of an apparatus of the type to which reference has just been made.

Referring to the drawing, A is a retort for distilling coal, lignite, etc., having an outlet pipe $a$ leading to a compressor B provided with piston $b$, said outlet pipe $a$ having a valve $c$ therein. C is a chamber for containing the heat preventive agent $c'$, or other liquid, said chamber C communicating with compressor B through pipe $d$, whereby the gaseous mixture from the compressor is passed through the liquid in the tank C, some of the readily condensable vapors carried by said gaseous mixture being condensed in said tank C. Tank C has a liquid outlet $d'$, controlled by valve $b'$, leading to compressor B, whereby liquid may be introduced from the chamber C into compressor B. Pipe $d'$ passes through a chamber D, provided with an inlet $e$ and an outlet $f$, whereby the liquid passing through the pipe $d'$ may be warmed or cooled as desired. Chamber C has a gaseous mixture outlet pipe $g$ provided with a valve $g'$, the major portion of which pipe passes through a cooling chamber E, through which a cooling agent is circulated, said cooling agent entering chamber E through pipe $h$, controlled by valve $h'$, and passing out through pipe $i$. Leading from pipe $g$ are the pipes $j$ $j'$ connecting with separators or condensors F F', respectively, of which there may be any number desired, depending on the number of condensable products which it is desired to separate and collect. The cooling agent being introduced into that end of the cooling chamber E most remote from the point at which the gases are compressed, makes the temperature at such remote point the lowest in the system, the temperature in pipe $g$ rising as it approaches tank C, thereby enabling the several condensable liquids to be separated in accordance with their liquefaction temperatures, the most readily condensable being nearest the compression cylinder, whereas those condensable at higher temperatures condense at points more remote from the compressor. E. g., the condensate in separator F will, naturally, be one which liquefiies at a higher temperature than that of the condensate in separator F'.

If it is desired to introduce into the gases from retort A some gaseous mixture, in order to increase the amount of condensable constituents therein, this may be done through pipe $k$ controlled by valve $k'$, said pipe connecting with main pipe $a$.

In the event it is desired to partially purify the gases from retort A, or any mixture which may have been formed with said gases, they may be passed, prior to compressing them, through a purifier, or scrubber, G, which connects with main $a$ through pipe $l$ controlled by valve $l'$. Purifier G is provided with a gaseous mixture exit $m$ leading to a separator H, in which may be separated and collected the heaviest or most readily condensable vapors carried by the gaseous mixture. The separator H has a gaseous mixture outlet pipe $n$, controlled by valve $n'$, through which said mixture may be led to compressor B and thereafter operated upon in the manner heretofore described.

If it is desired to introduce crude oil, or any of its constituents, into the gaseous mixture, this may be effected by means of pipe $o$, said oil or vapors thereof entering pipe $m$ through valve $o'$, or main $a$, through branch pipe $p$, controlled by valve $p'$, the particular point of inlet depending on whether or not the gaseous mixture has passed through the purifier G.

From the foregoing description of the apparatus and its operation, applicant's process will be readily understood, but it may be described, briefly, as follows:

The gas, or mixed gases, entering pipe $a$ may either be passed direct to compressor B, or indirectly through scrubber G and separator H, depending on whether or not it is desired to purify the gas prior to compressing it. If the gas carrying vapor is to be mixed with the distillation products from retort A, said gas may be introduced into main $a$ through pipe $k$ and valve $k'$. If it is desired to mix crude oil, or any component thereof, such as illuminating oil, said oil may be introduced into the gaseous mixture from pipe $o$, either into pipe $a$ through valve $p'$, or into pipe $m$ through valve $o'$. Whichever mixture is being operated upon, the next step is to compress it in compressor B, whence it passes through pipe $d$, through the liquid $c'$ in chamber C, and thence through outlet pipe $g$, through the cooler or refrigerator E. The effect of this cooling operation is to condense all the lighter products which the gaseous mixture carried, and the condensates are trapped out, or separated, in separators F F', etc. If it is desired to use a heat preventive agent in the compression cylinder, this can be introduced therein through tank C, through pipe $d'$ controlled by valve $b'$, as heretofore described. Moreover, crude oil may be used in tank C and fed to the compression cylinder B, thereby using such crude oil, or one of its constituents, if desired, as a heat preventive agent, and at the same time recovering purified distillates therefrom.

The added gas introduced through pipe $k$, may, if desired, be preheated. Moreover, it may, with or without preheating, be introduced directly into retort A. If preheated to a sufficiently high temperature prior to its introduction into the retort, it may serve as the means for heating the coal, lignite, etc., within said retort so as to effect the distillation thereof without necessitating the employment of any other heating means.

Having thus fully described the invention, what I claim as new, and desire to secure by Letters Patent is:—

1. The process of treating gas containing condensable vapors, which consists in mixing it with additional condensable vapors, compressing the mixture in the presence of a heat absorbing agent, and then subjecting it to the action of an external cooling agent, said cooling agent being passed in a direction opposite to that of the flow of gaseous mixture, whereby the gaseous mixture is gradually cooled, and the vapors therein condensed and fractionated.

2. The process which consists in mixing petroleum vapors with a gaseous carrier other than air, compressing the mixture in the presence of a purifying agent, and then cooling it to successively lower temperatures, whereby the purified vapors are condensed and separated.

3. The process which consists in mixing petroleum vapors with a gaseous carrier other than air, compressing the mixture in the presence of a heat absorbing agent, and then cooling it so as to condense the vapors therein.

4. The process which consists in producing a mixture of gases and vapors, adding petroleum vapors thereto, compressing the mixture, and cooling it so as to separate out the condensable hydrocarbons.

5. The process which consists in producing a mixture of gases and vapors, adding petroleum vapors thereto, compressing the mixture in the presence of a purifying agent, and cooling it so as to separate out the condensable hydrocarbons.

6. The process which consists in mixing a gas containing condensable hydrocarbons with another gas containing condensable hydrocarbons, compressing the mixture in the presence of a heat preventive agent, and thereafter cooling the mixture to separate out the condensable vapors.

In testimony whereof I have signed my name to this specification in the presence of two subscribing witnesses.

AUGUSTE JEAN PARIS, Jr.

Witnesses:
F. S. FITZSIMONS,
A. A. CARNEY.